(12) United States Patent
Braun

(10) Patent No.: US 6,531,024 B1
(45) Date of Patent: Mar. 11, 2003

(54) IN-LINE CONSTRUCTION OF PRISMATIC LABELS

(75) Inventor: Robert A. Braun, Dublin, OH (US)

(73) Assignee: Wisconsin Label Corporation, Algoma, WI (US)

(*) Notice: Subject to any disclaimer, the term of this patent is extended or adjusted under 35 U.S.C. 154(b) by 0 days.

(21) Appl. No.: 09/544,080

(22) Filed: Apr. 6, 2000

(51) Int. Cl.[7] ................................................. B32B 31/18
(52) U.S. Cl. ........................ 156/277; 156/268; 156/269; 156/324
(58) Field of Search ................................ 156/297, 249, 156/267, 269, 270, 277, 278, 291, 324

(56) References Cited

U.S. PATENT DOCUMENTS

| | | | |
|---|---|---|---|
| 5,306,899 A | | 4/1994 | Marom et al. .............. 235/382 |
| 5,405,475 A | * | 4/1995 | Kraft et al. .............. 156/277 X |
| 5,510,911 A | * | 4/1996 | Sharpe et al. ........... 156/324 X |
| 5,601,682 A | * | 2/1997 | Longtin .................... 156/277 X |
| 5,656,360 A | * | 8/1997 | Faykish et al. |
| 5,857,709 A | | 1/1999 | Chock .......................... 283/86 |
| 6,214,443 B1 | * | 4/2001 | Palmasi et al. |

OTHER PUBLICATIONS

"Labels, A Knowledge Book," National Business Forms Association, 1983, pp. 1–144.*

* cited by examiner

Primary Examiner—Curtis Mayes
(74) Attorney, Agent, or Firm—Eugene Stephens & Associates; Thomas B. Ryan

(57) ABSTRACT

A succession of prismatic labels are made on an in-line press by laminating an embossed metallic material web to one of a choice of conventional label stock webs. Within the same in-line press operation, various steps of printing and die cutting are performed on the laminated prismatic label stock web to produce the succession of prismatic labels.

28 Claims, 5 Drawing Sheets

IN-LINE CONSTRUCTION OF PRISMATIC LABELS

TECHNICAL FIELD

Metallic materials micro-embossed with laser-generated patterns are incorporated into various label structures and printed with ink patterns that complement the laser-generated patterns.

BACKGROUND

Prismatic labels combine holographic effects of micro-embossed metallic materials with conventional printing to present dynamic images that flash through a range of colors. Conventionally embossed holographic patterns vary visually with line of sight. Conventional printing does not. Together, printing over holographic patterns provides more stable imagery whose reflective characteristics and colors vary with line of sight.

The metallic materials are typically metalized film or paper materials that have bright reflective surfaces. Lasers micro-emboss repeating patterns of grooves into a supporting structure of the metallic material to diffract light striking the metallic material into chromatically dispersed images. Printing inks overlying the holographic patterns can be opaque or translucent. The opaque inks block any effects of the underlying holographic patterns to provide stable image portions. The translucent inks provide color filters through which the holographic effects are still evident.

Prismatic label construction starts with a choice of micro-embossed metallic material that exhibits desired holographic effects such as repeating rainbow or star patterns. The metallic material, which has the form of a continuous web, can be coated with a layer of pressure-sensitive adhesive and laminated to a release liner. Now in the form of a prismatic label stock, further conversion into prismatic labels is achieved by printing on the holographic surface and die cutting the metallic material into individual labels.

A considerable capital investment is required to form the micro-embossed metallic material into prismatic label stock. In addition, prismatic label stock is processed in much smaller quantities than conventional label stock because of the much wider uses for conventional label stock. Accordingly, the cost of prismatic label stock is much higher, which tends to limit its use.

SUMMARY OF INVENTION

My method of making prismatic labels significantly reduces their cost while providing improved construction opportunities as well as cost-effective construction alternatives for meeting different market demands. The cost reductions are achieved by exploiting the much lower costs of conventional label stocks. In addition, the wider variability of conventional label stocks, such as for making piggyback labels or redeemable coupon labels, is further exploited for making such constructions available in prismatic forms.

An in-line printing method of making pressure-sensitive prismatic labels according to my invention includes advancing both a web of micro-embossed metallic material and a web of conventional label stock along an in-line press. The conventional label stock has a substrate that is coated with a pressure-sensitive adhesive and is laminated to a release liner. The two webs are bonded together with adhesive and further advanced through a plurality of in-line printing stations that print a succession of patterns on the web of micro-embossed metallic material so that holographic effects of the embossed metallic material remain evident through at least some of the printing. Repeating patterns are cut through both the web of micro-embossed metallic material and the substrate of the label stock to define individual pressure-sensitive prismatic labels.

Both the substrate of the label stock and the adhesive required to bond the substrate together with the micro-embossed metallic material constitute additional layers beyond those normally assembled for constructing pressure-sensitive prismatic labels. However, cost savings from acquiring conventional label stocks over available prismatic label stocks more than offset any costs attributable to the additional materials.

The micro-embossed metallic material is preferably a metalized film in which a metal such as aluminum or zinc is deposited onto a film such as a polypropylene, polyethylene, polystyrene, polyester, or polyvinyl chloride. The label stock substrate is preferably paper. When bonded together, the metalized film and paper substrate form stronger and more durable labels. The paper substrate contributes increased rigidity, and the metalized film contributes tear resistance and an environmental barrier.

Film-based label stocks can also be used, especially for particularly adverse (e.g., wet) environments. For example, the metallic material in the form of a metalized film can be bonded to a label stock made of polyolefin for eventual mounting on squeeze bottles or other flexible substrates. A wide choice of adhesives is also available with conventional label stocks, which would otherwise be impractical to make available in the form of prismatic label stock. The adhesives can vary in qualities such as co-adhesion, repositionability, removability, and resistance to cold.

The in-line printing preferably includes (a) applying an opaque ink in a succession of patterns for blocking holographic effects of the micro-embossed metallic material in limited areas of the embossed metallic material and (b) applying a translucent ink in a succession of patterns for chromatically filtering holographic effects of the micro-embossed metallic material in other limited areas of the embossed metallic material. The printing stations for applying both the opaque ink and the translucent ink are preferably flexographic printing stations.

The conventional label stock can take a variety of forms for extending prismatic label construction into uses that would otherwise be even less economically viable. For example, the label stocks can vary from single card stocks to piggyback or redeemable coupon label stocks that involve additional substrates and layers of adhesive. In addition, the same micro-embossed metallic material can be bonded to a plurality of different conventional label stocks, which are available in smaller quantities; or more than one micro-embossed metallic material can be bonded to the same label stock.

More efficient use of the micro-embossed metallic material is achieved by bonding the metallic material to limited portions of the conventional label stock. For example, the web of micro-embossed metallic material can be narrower than the web of conventional label stock so that the metallic material covers only a portion of the width of the label stock. Conventional printing can be applied to both the metallic material and the exposed portion of the conventional label stock. The adhesive, which bonds the metallic material to the label stock, can be applied in a pattern in registration with a die cutting station so that the metallic material can be applied to the conventional label stock in a succession of closed shapes.

DRAWINGS

DETAILED DESCRIPTION

Figure 1:
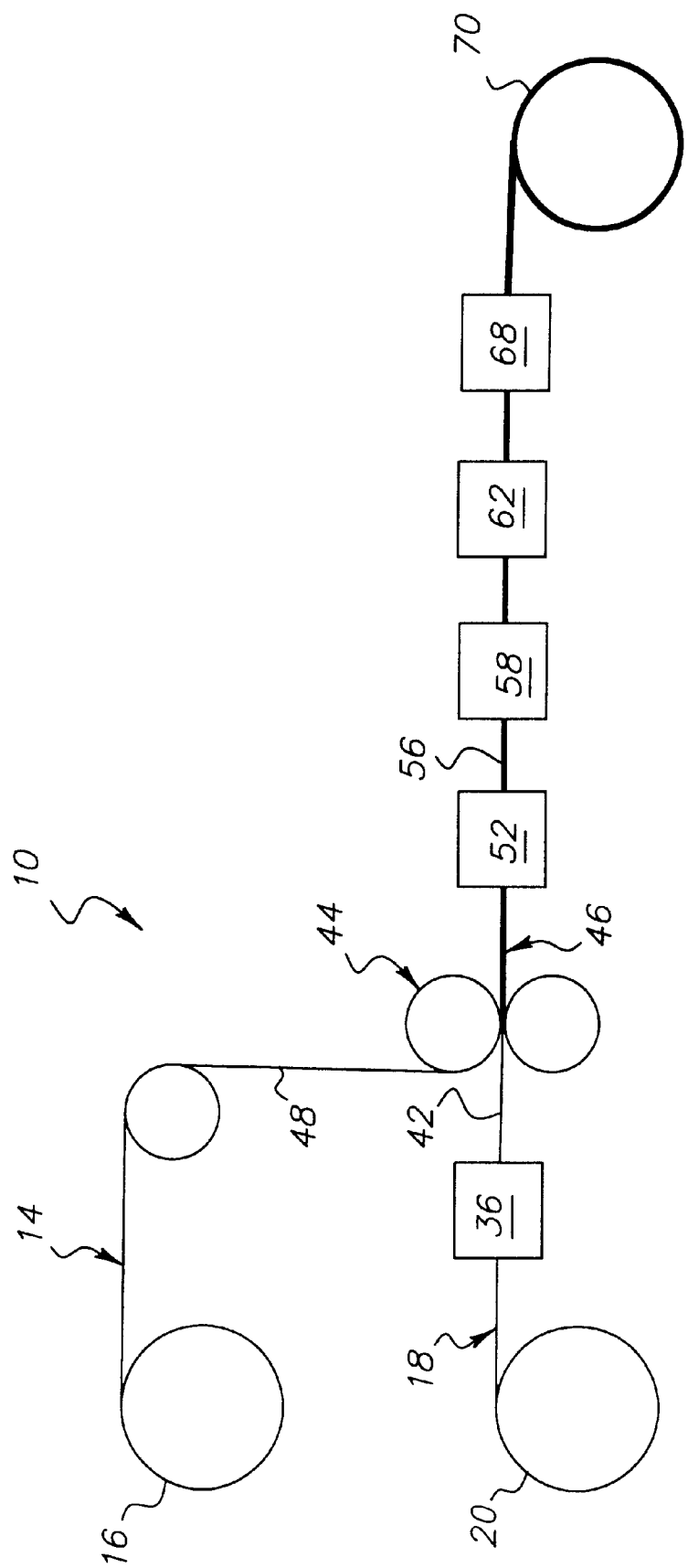
FIG. 1 is a diagram of an in-line press that combines a micro-embossed metallic material web with a conventional label stock web for making a succession of prismatic labels.
Figure 2:
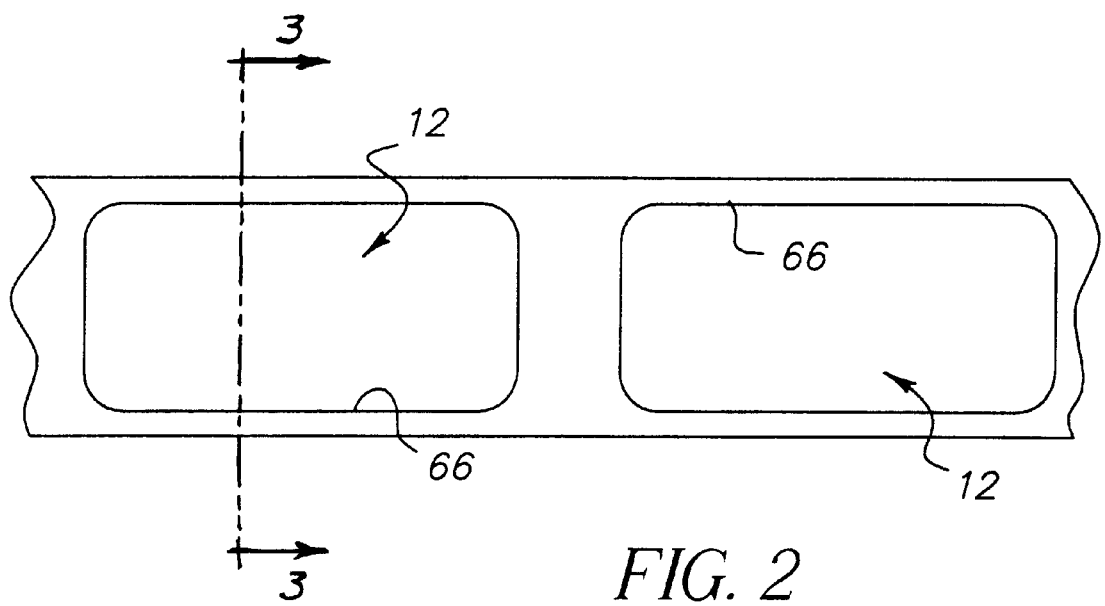
FIG. 2 is a top view showing a cut-away length of the succession of labels made on the in-line press of FIG. 1.
Figure 3:
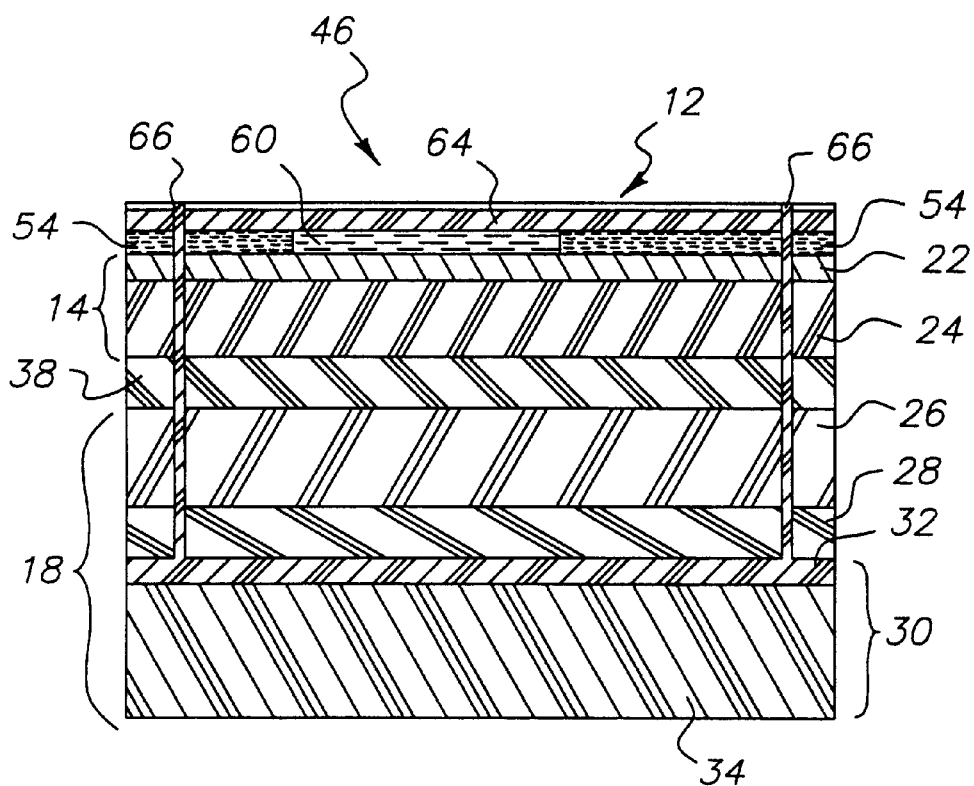
FIG. 3 is an enlarged cross-sectional view through a combined prismatic material label stock web taken along line 3—3 of FIG. 2.

An in-line press 10 is shown in FIG. 1 for making prismatic labels, such as prismatic labels 12 shown in FIGS. 2 and 3. At the start of the press 10, a web 14 of micro-embossed metallic material unwinds from a roll 16 and a web 18 of conventional label stock unwinds from a roll 20.

The web 14 of micro-embossed metallic material can be made from a variety of self-supporting materials including paper, film, or foil. The metallic material, if not already in the form of a foil, can be deposited or otherwise transferred to the paper or film material. For example, the label 12 is shown with a thin metal layer 22 deposited onto a film base 24. The preferred metal is aluminum, but other metals including zinc or silver could also be used. The preferred film is 72 gauge polypropylene, but other gauges and types of films including polyethylene, polystyrene, polyester, or polyvinyl chloride films could also be used. Although shown with the thin metal layer 22 above the film base 24, this arrangement can be inverted if the film base 24 is transparent.

Lasers are ordinarily used to micro-emboss the film base 24 of the metallic material with repeating holographic patterns prior to the deposition of the thin metal layer 22. Conventional replication techniques could also be used to produce the desired holographic patterns.

The web 18 of conventional label stock can take a variety of forms, but preferably includes a substrate (i.e., facestock) 26, such as a paper or film substrate, having a pressure-sensitive adhesive backing 28 mounted on a release liner 30. Considered in more detail, the release liner 30 includes a layer 32 of a release material, such as silicone, coated onto another substrate 34, which can also be a paper or film material. Additional or alternative substrates, layers of adhesive materials, or layers of release materials can be arranged to form other types of conventional label stock.

An applicator station 36 applies an adhesive 38 to a front surface 42 of the conventional label stock web 18 in advance of a laminator 44 that bonds the micro-embossed metallic material web 14 to the conventional label stock web 18, forming a laminated prismatic label stock web 46. The adhesive 38 is preferably a water-based heat-dried glue, such as CRODALAM 30-38-6 from Croda Adhesives, Inc., Itasca, Ill.; but a variety of other adhesives capable of forming bonds between the two webs 14 and 18 could also be used. These include hot melts, acrylics, acrylic emulsions, or rubber- or solvent-based adhesives as well as heat-activated or UV-cured adhesives. The adhesive 38 could also be applied to a back surface 48 of the metallic material web 14 in advance of the laminator 44 in addition to or as an alternative to the adhesive 38 on the front surface 42 of the conventional label stock web 18.

A first printing station 52 applies an opaque ink 54 in a repeating pattern to limited areas of a top surface 56 of the micro-embossed metallic material web 14. A second printing station 58 applies a translucent ink 60 in a repeating pattern to other limited areas of the top surface 56. The opaque ink 54 blocks holographic effects of the micro-embossed metallic material web 14. The translucent ink 60 chromatically filters holographic effects of the micro-embossed metallic material. Additional printing stations can be added to the press 10 to apply opaque or translucent inks 54 or 60 in desired color combinations, Conventional treatments, such as corona discharge or top coating, can be applied in advance of the printing stations 52 and 58 to make the top surface 56 more receptive to the inks 54 and 60.

A coating station 62 applies a protective coating 64, such as a varnish, over substantially the entire top surface 56 of the metallic material web 14 to protect the inks 54 and 60 from abrasion or other environmental hazards. Alternatively, a clear or translucent overlay film could be laminated over the top surface 56 to provide more substantial protection.

The laminated web of prismatic label stock 46 is partially cut through in a repeating pattern 66 by a die cutting station 68 that divides the laminated web 46 into the succession of prismatic labels 12 which are rewound onto a roll 70. The patterns of partial cuts 66 are made through both the micro-embossed metallic material web 14 and the substrate 26 of the conventional label stock web 18. In place of a rewind roll 70, the die-cut prismatic label stock web 26 could be folded into a stack or separated into individual sheets that are stacked or even separately mounted onto yet another substrate.

The various laminating, coating, printing, and die cutting stations can be arranged in different orders and combinations on the press 10. For example, printing could be applied to the micro-embossed metallic material web 14 prior to lamination. Other stations, including adhesive curing or processing stations, could also be added to perform alternative or additional functions known in the art of in-line press operation.

Figure 4:
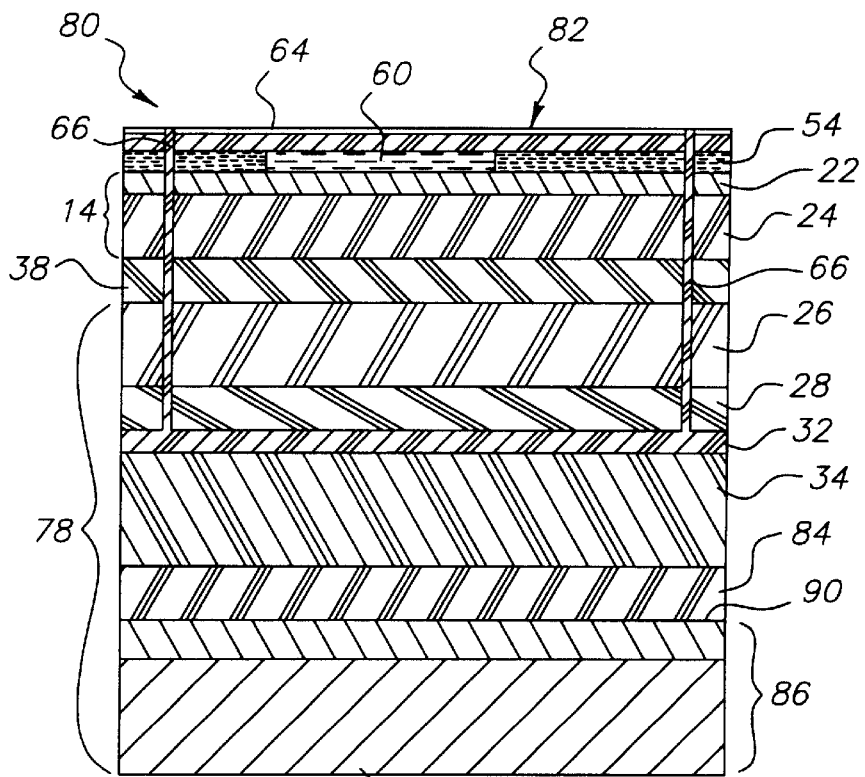
FIG. 4 is a similarly enlarged cross-sectional view of a similarly combined prismatic piggyback label stock processed according to my invention.
Figure 5:
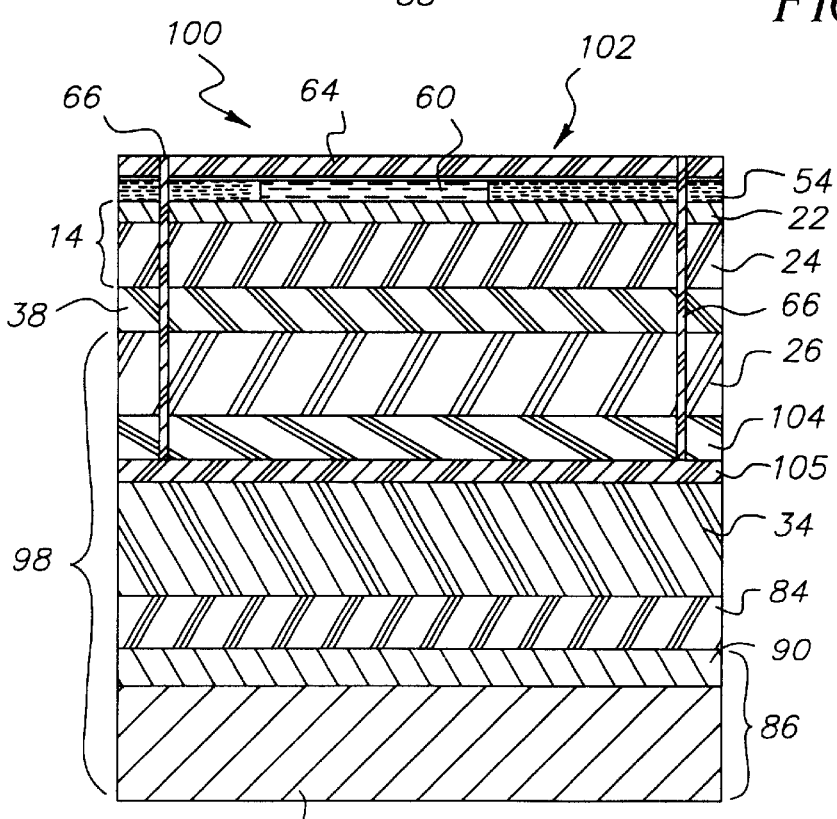
FIG. 5 is a similarly enlarged cross-sectional view of a similarly combined prismatic redeemable coupon label stock processed according to my invention.

FIGS. 4 and 5 illustrate other types of prismatic labels that can be similarly constructed from other forms of conventional label stock. Layers in common with the prismatic label stock 46 of the previous embodiment are referenced by the same numerals.

In FIG. 4, a conventional piggyback label stock web 78 is combined with the micro-embossed metallic material web 14 to construct a laminated prismatic piggyback label stock web 80 that can be divided into a succession of prismatic piggyback labels 82. The additional layers include another layer of pressure-sensitive adhesive 84 and a release liner 86 comprising a substrate 88 and a layer of release material 90. During use, the release liner 86 is removed and the remainder of the prismatic piggyback label stock web 80 is mounted on another substrate (not shown). The individual prismatic piggyback labels 82 are removable from the remounted prismatic piggyback label stock web 80 and are themselves remountable on yet another substrate (not shown).

In FIG. 5, a conventional redeemable coupon label stock web 98 is combined with the micro-embossed metallic material web 14 to construct a laminated prismatic redeemable coupon label stock web 100 that can be divided into a succession of prismatic redeemable labels 102. The layers are substantially the same as for the prismatic piggyback label stock web 80, but the adhesive layer 28 and the release layer 32 are replaced by a layer 104 of fugitive adhesive and a printed layer 105.

Although produced in large lots, the various conventional label stock webs 18, 78, and 98 can be economically acquired in much smaller quantities, including smaller lengths and widths. On the other hand, the micro-embossed metallic material webs 14 can be acquired more economically in larger lengths for making a variety of different prismatic labels by laminating the same micro-embossed metallic material web 14 to more than one of the various conventional label stock webs 18, 78, and 98. In addition to varying in type, the conventional label stock webs can vary in material selection or dimension to produce different prismatic labels with the same prismatic material webs.

Figure 6:
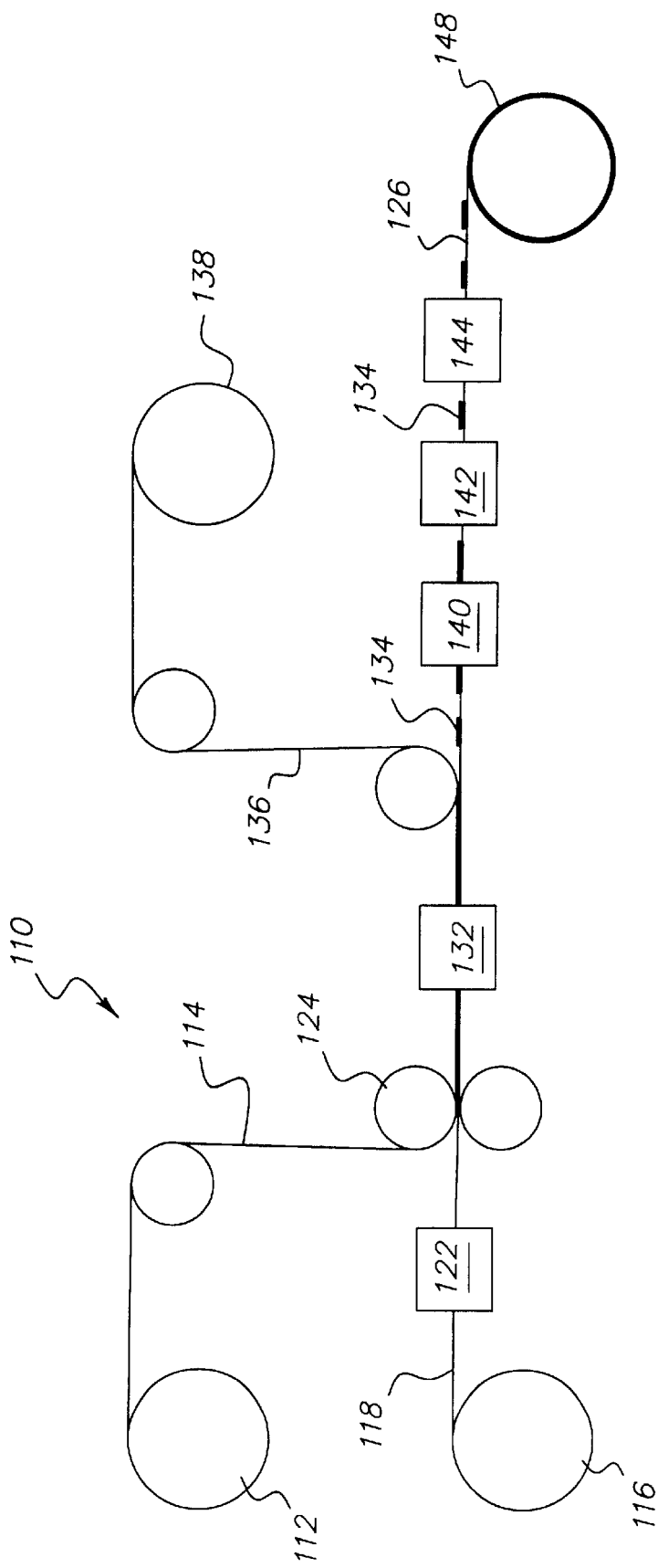
FIG. 6 is a diagram of another in-line press that combines a narrower width micro-embossed metallic material web with a conventional label stock web for making a succession of hybrid prismatic labels.
Figure 7:
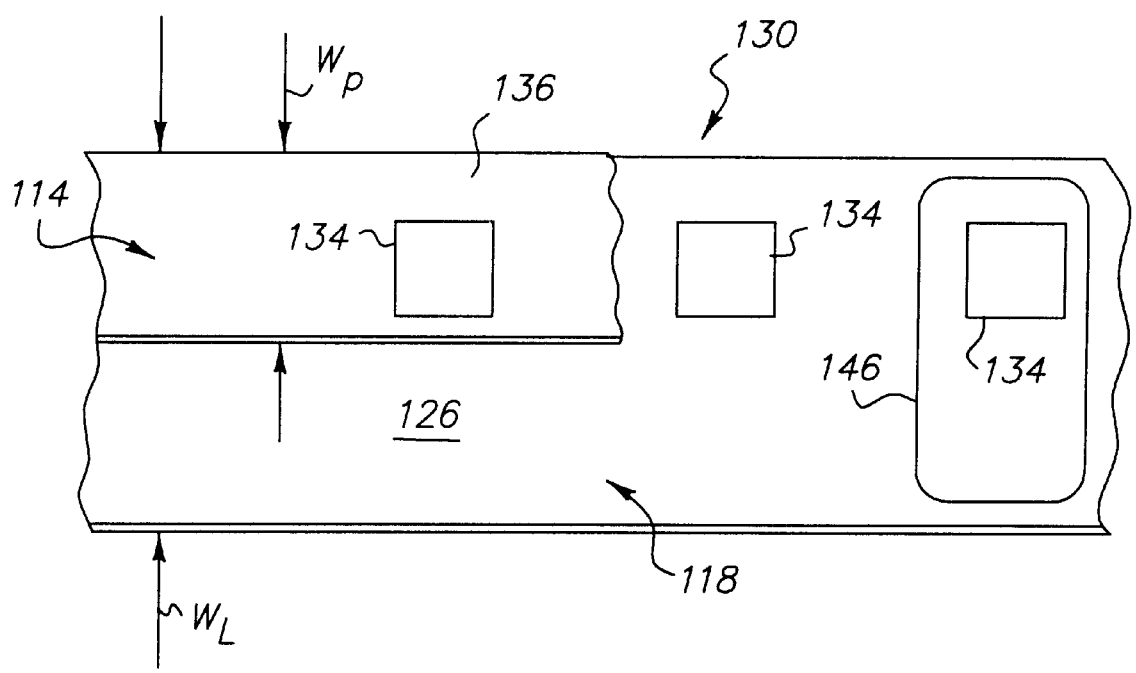
FIG. 7 is a top view showing the formation of the hybrid prismatic labels in a succession of stages.

FIGS. 6–7 illustrate the manufacture of hybrid prismatic labels along an in-line press 110. Similar to the press 10 of FIG. 1, the press 110 includes a roll 112 that feeds a web of micro-embossed metallic material 114 and a roll 116 that feeds a web 118 of conventional label stock. As seen in FIG. 7, the web of micro-embossed metallic material 114 has a width "$W_P$" that is narrower than a width "$W_L$" of the web of label stock 118.

An applicator station 122 applies an adhesive to a limited portion of the width "$W_L$" of the label stock web 118 for bonding the metallic material web 114 to a corresponding portion of the label stock web 118. For bonding continuous lengths of the metallic web 114, conventional flood coating can be used. However, the applicator station 122 is arranged to apply the adhesive in repeating patterns for adhering successive portions of the metallic material web 114. A conventional tint roller or screen printing can be used for this purpose.

A laminator 124 joins the two webs 114 and 118 together so that the metallic web 114 covers only a portion of the label stock web 118. An uncovered portion 126 of the label stock web 118 remains exposed. Assuming that the adhesive is applied in repeating patterns for making the completed prismatic label stock 130 of FIG. 7, a die cutting station 132 in registration with the applicator station 122 cuts repeating patterns through the metallic material web 114 in positions corresponding to the repeating patterns of adhesive for dividing the metallic material web 114 between portions 134 that are bonded to the label stock web 118 and matrix portions 136 that are rewound onto a roll 138.

A printing station 140, which represents all of the printing stations that may be required, applies opaque or translucent ink in various combinations to both the bonded portions 134 of the metallic material web 114 and the uncovered portion 126 of the label stock web 118. Holographic effects of the metallic material bonded portions 134 are evident through the printing. The uncovered portion 126 of the label stock web 118 exhibits conventional printing effects.

A coating station 142 and a final die cutting station 144 complete the exemplary operations of the press 110. The coating station 142 applies a protective coating over both the bonded portions 134 of the metallic material web 114 and the uncovered portion 126 of the label stock web 118 to protect the underlying printing. A thin transparent or translucent laminate could be used to provide more robust protection. The die cutting station 144 partially cuts through the conventional label stock web 118 supporting the metallic material portions 134 to form a succession of hybrid prismatic labels 146, which contain exposed portions of both embossed metallic material and conventional label stock.

Although shown rewound onto a roll 148, the succession of hybrid prismatic labels 146 can be arranged in a variety of different forms including being fan-folded or stacked into individual sheets containing one or more of the labels 146. Additional or alternative operations can be performed to accomplish other known objectives of in-line printing systems. For example, surface treatments can be performed to increase the adherence of the ink, curing stations can be added to facilitate curing of adhesives or other coatings, and perforations can be formed through the label stock web 118 to separate the hybrid prismatic labels 146 individually or in groups.

The narrower width "$W_P$" of the micro-embossed metallic material web 114 in relation to the width "$W_L$" of the conventional label stock web 118 saves material cost and provides for incorporating micro-embossed metallic materials in different, particularly larger, width labels. The same micro-embossed metallic material web 114 can also be laminated to other conventional label stock webs differing in size or content. Alternatively, more than one micro-embossed metallic material web with different holographic patterns could be laminated to the same label stock web to provide even more flexibility for hybrid prismatic label design.

I claim:

1. An in-line printing method of making prismatic labels along an in-line press comprising the steps of:

mounting a web of embossed metallic material on the in-line press;

advancing the web of embossed metallic material along the in-line press;

mounting a pre-assembled web of label stock on the in-line press, said pre-assembled web including a substrate coated with a pressure-sensitive adhesive and laminated to a release liner;

advancing the pre-assembled web of label stock along the same in-line press;

bonding the web of embossed metallic material to the web of label stock along the same in-line press;

printing a succession of patterns on the web of embossed metallic material along the same in-line press so that holographic effects of the embossed metallic material remain evident through at least some of the printing; and cutting repeating patterns through both the web of embossed metallic material and the substrate of the label stock along the same in-line press to define individual pressure-sensitive prismatic labels, wherein the steps of advancing, bonding, printing, and cutting are performed together during a single press run.

2. The method of claim 1 in which the step of printing includes applying an opaque ink in a succession of patterns for blocking holographic effects of the embossed metallic material in limited areas of the embossed metallic material.

3. The method of claim 2 in which the step of printing includes applying a translucent ink in a succession of patterns for chromatically filtering holographic effects of the embossed metallic material in other limited areas of the embossed metallic material.

4. The method of claim 3 in which the step of printing includes printing both the opaque ink and the translucent ink with flexographic printing stations.

5. The method of claim 1 in which the web of embossed metallic material is a metalized film, and the substrate of the web of label stock is a paper material.

6. The method of claim 1 in which the web of embossed metallic material is a metalized film, and the substrate of the web of label stock is a polyolefin material.

7. The method of claim 1 including a further step of applying a protective layer over the printing applied to the embossed metallic material.

8. An in-line printing method of making prismatic labels comprising the steps of:
  advancing a web of embossed metallic material along an in-line press;
  advancing a web of label stock, including a substrate coated with a pressure-sensitive adhesive and laminated to a release liner, along the in-line press;
  bonding the web of embossed metallic material to the web of label stock;
  printing a succession of patterns on the web of embossed metallic material so that holographic effects of the embossed metallic material remain evident through at least some of the printing; and
  cutting repeating patterns through both the web of embossed metallic material and the substrate of the label stock to define individual pressure-sensitive prismatic labels,
  wherein the web of label stock has multiple layers of adhesive material.

9. The method of claim 8 in which the web of label stock is a piggyback label stock having multiple release liners, and the multiple layers of adhesive include two layers of pressure-sensitive adhesive.

10. The method of claim 8 in which the web of label stock is a redeemable coupon label stock having multiple printed substrates, and the multiple layers of adhesive material include a fugitive adhesive layer.

11. A method of manufacturing a plurality of different types of prismatic labels with a single embossed metallic material comprising the steps of:
  acquiring a linear quantity of the single embossed metallic material wound in one or more rolls;
  acquiring a linear quantity of a first label stock also wound in one or more rolls and having a substrate coated with a pressure-sensitive adhesive and laminated to a release liner;
  mounting one of the rolls of the first label stock together with one of the rolls of the single embossed metallic material on a common in-line press;
  bonding a first continuous length of the single embossed metallic material from the one roll of the single embossed metallic material to a corresponding length of the first label stock;
  printing a succession of patterns on the first length of the single embossed metallic material so that holographic effects of the single embossed metallic material are evident through at least some of the printing;
  cutting repeating patterns through both the first length of the single embossed metallic material and the substrate of the first label stock to define a first set of individual pressure-sensitive prismatic labels;
  acquiring a linear quantity of a second label stock also wound in one or more rolls and having a substrate coated with a pressure-sensitive adhesive and laminated to a release liner;
  mounting one of the rolls of the second label stock;
  bonding a second continuous length of the single embossed metallic material within the same one roll of the single embossed metallic material to a corresponding length of the second label stock;
  printing a succession of patterns on the second length of the single embossed metallic material so that holographic effects of the embossed metallic material are evident through at least some of the printing; and
  cutting repeating patterns through both the second length of the single embossed metallic material and the substrate of the second label stock to define a second set of individual pressure-sensitive prismatic labels.

12. The method of claim 11 in which the substrates of the first and second label stocks differ from each other.

13. The method of claim 11 in which the embossed metallic material is a metalized film, and the substrates of the first and second label stocks are made of paper materials.

14. The method of claim 11 in which the step of printing includes applying opaque ink in a succession of patterns for blocking holographic effects of the embossed metallic material in limited areas of the embossed metallic material.

15. The method of claim 14 in which the step of printing includes applying a translucent ink in a succession of patterns for chromatically filtering holographic effects of the embossed metallic material in other limited areas of the embossed metallic material.

16. The method of claim 15 in which the step of printing includes printing both the opaque ink and the translucent ink with flexographic printing stations.

17. A method of manufacturing a plurality of different types of prismatic labels with a single embossed metallic material comprising the steps of:
  acquiring a linear quantity of the embossed metallic material wound in one or more rolls;
  acquiring a linear quantity of a first label stock also wound in one or more rolls and having a substrate coated with a pressure-sensitive adhesive and laminated to a release liner;
  bonding a first continuous length of the embossed metallic material to a corresponding length of the first label stock;
  printing a succession of patterns on the first length of embossed metallic material so that holographic effects of the embossed metallic material are evident through at least some of the printing;
  cutting repeating patterns through both the first length of embossed metallic material and the substrate of the first label stock to define a first set of individual pressure-sensitive prismatic labels;
  acquiring a linear quantity of a second label stock also wound in one or more rolls and having a substrate coated with a pressure-sensitive adhesive and laminated to a release liner;
  bonding a second continuous length of the embossed metallic material to a corresponding length of the second label stock;
  printing a succession of patterns on the second length of the embossed metallic material so that holographic effects of the embossed metallic material are evident through at least some of the printing; and
  cutting repeating patterns through both the second length of embossed metallic material and the substrate of the second label stock to define a second set of individual pressure-sensitive prismatic labels, wherein the adhesives of the first and second label stocks differ from each other.

18. A method of manufacturing a plurality of different types of prismatic labels with a single embossed metallic material comprising the steps of:

acquiring a linear quantity of the embossed metallic material wound in one or more rolls;

acquiring a linear quantity of a first label stock also wound in one or more rolls and having a substrate coated with a pressure-sensitive adhesive and laminated to a release liner;

bonding a first continuous length of the embossed metallic material to a corresponding length of the first label stock;

printing a succession of patterns on the first length of embossed metallic material so that holographic effects of the embossed metallic material are evident through at least some of the printing;

cutting repeating patterns through both the first length of embossed metallic material and the substrate of the first label stock to define a first set of individual pressure-sensitive prismatic labels;

acquiring a linear quantity of a second label stock also wound in one or more rolls and having a substrate coated with a pressure-sensitive adhesive and laminated to a release liner;

bonding a second continuous length of the embossed metallic material to a corresponding length of the second label stock;

printing a succession of patterns on the second length of the embossed metallic material so that holographic effects of the embossed metallic material are evident through at least some of the printing; and cutting repeating patterns through both the second length of embossed metallic material and the substrate of the second label stock to define a second set of individual pressure-sensitive prismatic labels, wherein the substrates of the first and second label stocks differ from each other, and wherein one of the first and second label stocks includes single layers of adhesive and release materials, and the other of the first and second label stocks includes multiple layers of both adhesive and release materials.

19. A method of manufacturing a plurality of different types of prismatic labels with a single embossed metallic material comprising the steps of:

acquiring a linear quantity of the embossed metallic material wound in one or more rolls;

acquiring a linear quantity of a first label stock also wound in one or more rolls and having a substrate coated with a pressure-sensitive adhesive and laminated to a release liner;

bonding a first continuous length of the embossed metallic material to a corresponding length of the first label stock;

printing a succession of patterns on the first length of embossed metallic material so that holographic effects of the embossed metallic material are evident through at least some of the printing;

cutting repeating patterns through both the first length of embossed metallic material and the substrate of the first label stock to define a first set of individual pressure-sensitive prismatic labels;

acquiring a linear quantity of a second label stock also wound in one or more rolls and having a substrate coated with a pressure-sensitive adhesive and laminated to a release liner;

bonding a second continuous length of the embossed metallic material to a corresponding length of the second label stock;

printing a succession of patterns on the second length of the embossed metallic material so that holographic effects of the embossed metallic material are evident through at least some of the printing; and cutting repeating patterns through both the second length of embossed metallic material and the substrate of the second label stock to define a second set of individual pressure-sensitive prismatic labels, wherein the linear quantity acquired of the embossed metallic material is larger than the individual linear quantities acquired of the first and second label stocks.

20. An in-line printing method of making prismatic labels comprising the steps of:

advancing a web of embossed metallic material having a given width along an in-line press;

advancing a web of label stock having a given width along the in-line press;

bonding the web of embossed metallic material to the web of label stock so that the web of embossed metallic material covers only a portion of the width of the web of label stock and a remaining portion of the width of the web of label stock retains uncovered by the web of embossed metallic material;

printing a succession of patterns on both the web of embossed metallic material and the remaining portion of the width of the label stock; and cutting repeating patterns through portions of the web of label stock to define individual prismatic labels having limited portions covered by the embossed metallic material.

21. The method of claim 20 including a further step of sizing the given widths so that the width of the web of embossed metallic material is narrower than the width of the web of label stock.

22. The method of claim 21 in which the step of bonding includes applying an adhesive to only the portion of the width of the web of label stock covered by the web of embossed metallic material.

23. The method of claim 22 in which the step of cutting also includes cutting repeating patterns through portions of the web of embossed metallic material.

24. The method of claim 20 in which the step of bonding includes applying an adhesive in a succession of patterns for bonding limited portions of the web of embossed metallic material to the web of label stock.

25. The method of claim 24 including a further step of cutting repeating patterns through portions of the web of embossed metallic material in registration with the succession of patterns of adhesive for dividing the web of embossed metallic material between portions that are bonded to the web of label stock and remaining portions that are not bonded to the web of label stock.

26. The method of claim 25 including a further step of rewinding the remaining portions of the web of embossed metallic material.

27. The method of claim 20 including further steps of advancing another web of embossed metallic material having a given width along the in-line press and bonding the another web of embossed metallic material to the web of label stock so that the another web of embossed metallic material covers only a portion of the width of the web of label stock and a remaining portion of the width of the web of label stock remains uncovered by the another web of embossed metallic material.

28. The method of claim 27 in which the web of embossed metallic material differs from the another web of embossed metallic material in holographic design.

* * * * *